United States Patent
Lu et al.

(10) Patent No.: US 10,544,912 B2
(45) Date of Patent: Jan. 28, 2020

(54) CASSETTE FOR HOLDING A PLANAR LIGHT SOURCE WITH A THERMALLY ISOLATED DRIVER BOARD

(71) Applicant: ABL IP Holding, LLC, Conyers, GA (US)

(72) Inventors: Min-Hao Michael Lu, Castro Valley, CA (US); Jonathon Wickus, Winona, MN (US)

(73) Assignee: ABL IP Holding, LLC, Conyers, GA (US)

( * ) Notice: Subject to any disclaimer, the term of this patent is extended or adjusted under 35 U.S.C. 154(b) by 303 days.

(21) Appl. No.: 15/412,708

(22) Filed: Jan. 23, 2017

(65) Prior Publication Data
US 2018/0209625 A1     Jul. 26, 2018

(51) Int. Cl.
| F21S 2/00 | (2016.01) |
| F21V 21/34 | (2006.01) |
| F21V 23/06 | (2006.01) |
| F21V 23/00 | (2015.01) |
| F21Y 115/15 | (2016.01) |
| F21V 15/01 | (2006.01) |
| F21V 19/00 | (2006.01) |

(52) U.S. Cl.
CPC ............. *F21S 2/00* (2013.01); *F21V 21/34* (2013.01); *F21V 23/006* (2013.01); *F21V 23/06* (2013.01); *F21V 15/01* (2013.01); *F21V 19/001* (2013.01); *F21Y 2115/15* (2016.08); *Y02B 20/36* (2013.01)

(58) Field of Classification Search
CPC .......... F21S 2/00; F21V 21/34; F21V 23/006; F21V 23/06
USPC ........................................................ 362/97.4
See application file for complete search history.

(56) References Cited

U.S. PATENT DOCUMENTS

| 5,779,346 A | * | 7/1998 | Burke | F21S 8/035 313/503 |
| 5,964,516 A | * | 10/1999 | Lai | F21S 8/035 362/641 |
| 6,170,958 B1 | * | 1/2001 | Chien | F21S 8/035 362/84 |
| 6,776,496 B2 | * | 8/2004 | Cok | F21K 9/00 362/414 |
| 7,344,296 B2 | * | 3/2008 | Matsui | F21K 9/00 362/249.01 |
| 8,142,065 B2 | * | 3/2012 | Cho | G02F 1/133603 362/631 |
| 9,062,836 B2 | | 6/2015 | Tran et al. | |
| 2008/0285271 A1 | * | 11/2008 | Roberge | F21S 8/033 362/235 |
| 2010/0284185 A1 | * | 11/2010 | Ngai | E04B 9/00 362/235 |
| 2011/0095701 A1 | * | 4/2011 | Tanahashi | H01L 51/5203 315/291 |

(Continued)

*Primary Examiner* — Bryon T Gyllstrom
(74) *Attorney, Agent, or Firm* — Beeson Skinner Beverly, LLP

(57) ABSTRACT

A loadable cassette holds a planar light source, such as a flat OLED panel, along with a companion driver board in a manner that allows both the light source and driver board to be operatively and replaceably connected to a luminaire or lighting system. The cassette maintains an air gap between the light source and driver board so as to prevent heat produced by the driver board from damaging the light source.

22 Claims, 16 Drawing Sheets

(56) References Cited

U.S. PATENT DOCUMENTS

| | | | | |
|---|---|---|---|---|
| 2011/0176308 A1* | 7/2011 | Wu | ........................... | F21S 4/28 |
| | | | | 362/247 |
| 2012/0294016 A1* | 11/2012 | Tran | ....................... | F21S 2/005 |
| | | | | 362/382 |
| 2013/0329438 A1* | 12/2013 | Wakahara | ............. | F21V 19/003 |
| | | | | 362/396 |

* cited by examiner

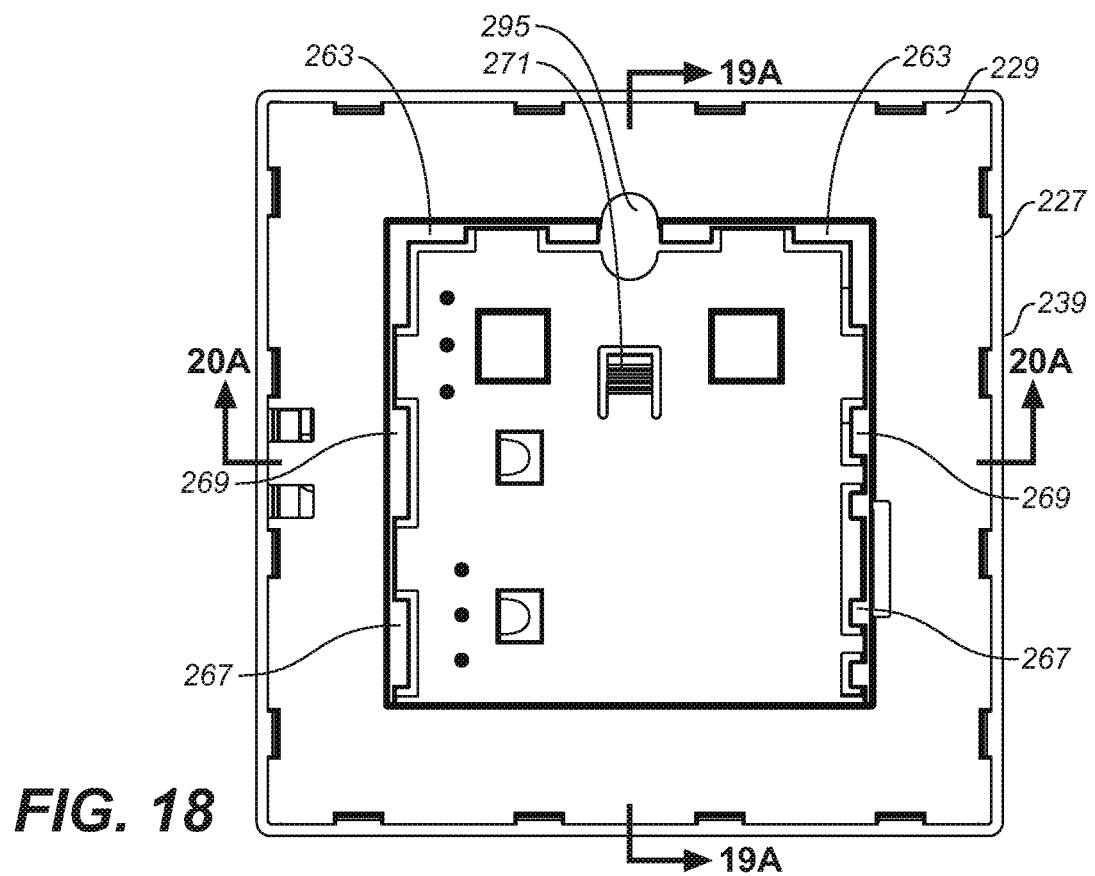

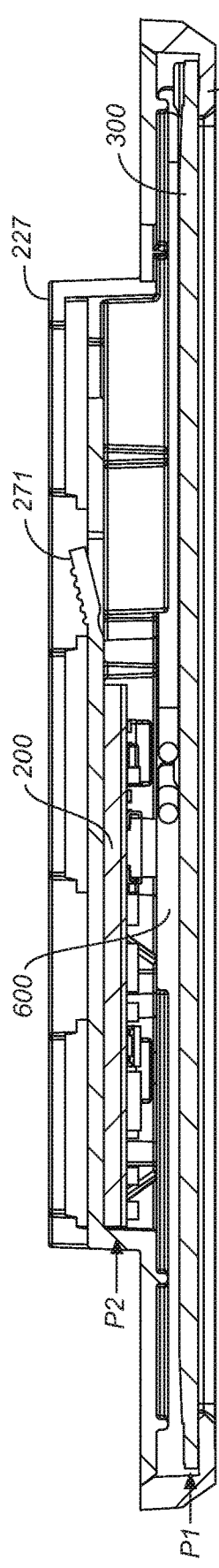
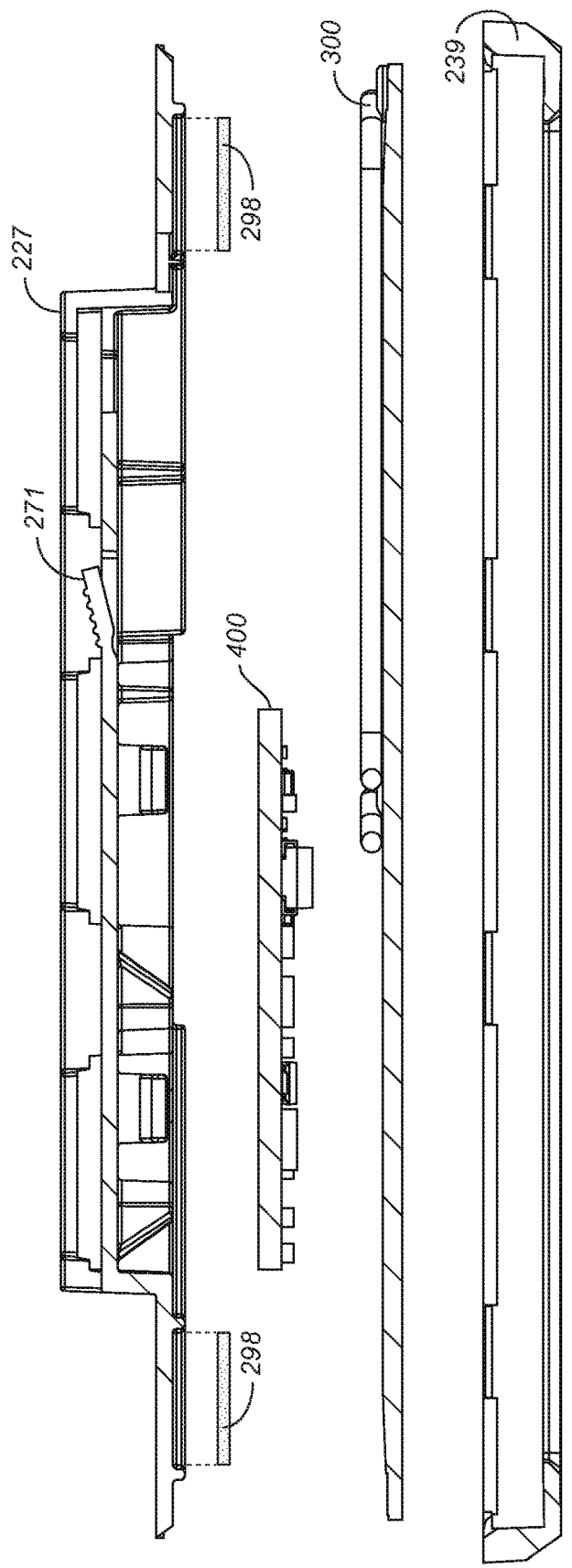
FIG. 19A
FIG. 19B

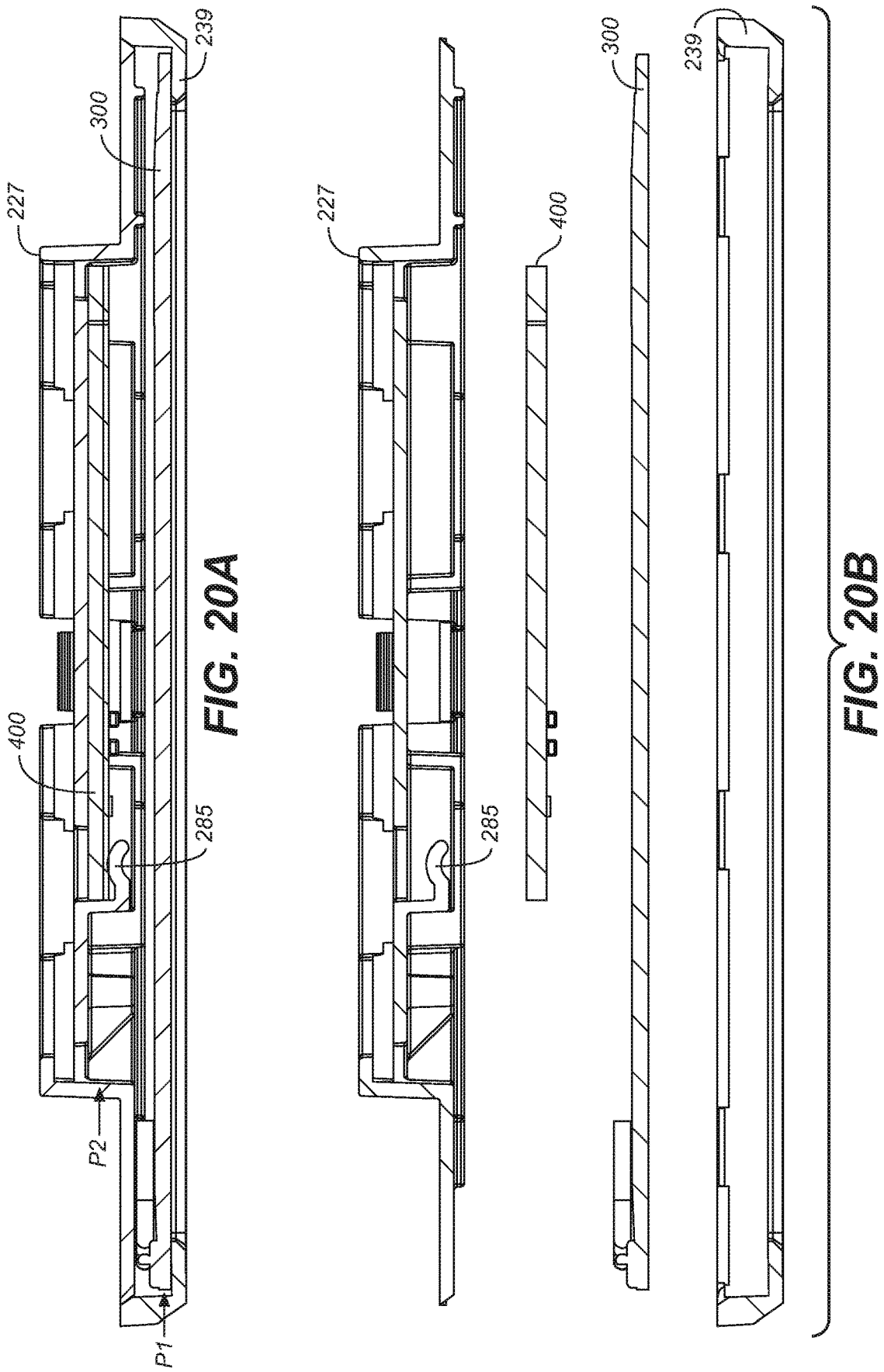

CASSETTE FOR HOLDING A PLANAR LIGHT SOURCE WITH A THERMALLY ISOLATED DRIVER BOARD

GOVERNMENT RIGHTS

This invention was made with Government support under U.S. Department of Energy Award No. DE-EE0007073. The Government has certain rights in the invention.

BACKGROUND OF INVENTION

The present invention generally relates to lighting systems that use planar light sources such as Organic Light Emitting Diodes (OLEDs), and more particularly relates to a means for operatively attaching planar light sources to such lighting systems.

OLED lighting systems exist that are comprised of a number of, and often a large number of, OLED panels. Individual OLED panels within the lighting system can be provided with their own microprocessor control unit, sometimes referred to as a "driver," which allows an OLED panel to be addressed by a system control unit for monitoring and controlling the panel. Heretofore, the approach to providing local panel drivers for the OLED panels of an OLED lighting system has been to bond the drivers directly to the back of the OLED panels. The difficulty with this approach is that the panel drivers produce heat, which detrimentally affects the operation of the OLEDs.

More generally, employing OLED's as the light source of choice presents challenges for lighting designers. Unlike conventional light sources, such as incandescent bulbs or fluorescent tubes that can easily be plugged into compatible lamp sockets mounted in a luminaire, flat panel light sources are relatively difficult to integrate into the structural environment of a luminaire or lighting system, and are relatively difficult to remove and replace. The cassette structure disclosed in U.S. Pat. No. 9,062,836 was devised to provide and means of attaching an OLED panel to a base structure of an OLED luminaire. However, while facilitating the attachment of OLED panels, the disclosed cassette structure does not contemplate the use of, or provide for accommodating a local driver for the OLED panel held in the cassette, much less addressing the problem of heat transfer between the OLED panel and a panel driver used with an OLED panel.

SUMMARY OF INVENTION

The present invention is directed to a means for mechanically holding a planar light source and a driver board so that the light source together with the driver board can be operatively and releasably connected to a luminaire or lighting system. The invention incorporates the light source and driver board into the luminaire or lighting system structure in a manner that is compatible with low profile components and that is aesthetically pleasing and also maintains the light source and driver board in thermal isolation from one another to prevent heat produced by the driver from damaging the light source.

More particularly, the invention involves a loadable cassette for releasably holding both a planar light source, such as an OLED panel, and a driver board for the light source so as to prevent thermal contact between these components. The cassette allows for easy insertion of a driver board and planar light source, while also allowing for wired connections within the cassette and to external wiring for the luminaire or lighting system to which the cassette is attached.

The cassette includes a low profile framing structure that can releasably retain the planar light source in a first plane and the driver board in a second plane substantially parallel to the first plane. In one aspect of the invention, there is sufficient distance between the first and second planes such that, when the light source and driver board are releasably retained within the framing structure, no portion of the driver board is in substantial contact, and preferably no direct contact, with the light source.

In another aspect of the invention, the low profile framing structure of the cassette is provided as a combination base plate and capture ring. The base plate can support the light source in the first plane and can releasably retain the driver board in the second plane. The capture ring attaches to the base plate and, when attached to the base plate, can hold the planar light source within the cassette.

In yet another aspect of the invention, the base plate includes a center recessed portion having a substantially flat back wall and a substantially flat, front-facing outer ledge portion surrounding the center recessed portion. The outer ledge portion is in the first plane and the back wall is in the second plane substantially parallel to the first plane. A retainer means holds the driver board along the back wall of the center recessed portion. The capture ring, when attached to the base plate, holds the planar light source against the outer ledge portion of the base plate.

Other and separate aspects of the invention will be apparent from the following description and accompanying drawings.

BRIEF DESCRIPTION OF THE DRAWINGS

FIG. 17 is a side elevational view of an assembled cassette in accordance with the invention.

FIG. 18 is a top plan view thereof.

FIG. 19A is a left side center cross-sectional view thereof taken along section lines 19A-19A of FIG. 18.

FIG. 19B is an exploded left side center cross-sectional view thereof.

FIG. 20A is a bottom center cross-sectional view thereof taken along section lines 20A-20A of FIG. 18.

FIG. 20B is an exploded bottom center cross-sectional view thereof.

DETAILED DESCRIPTION OF THE ILLUSTRATED EMBODIMENT

Figure 1:
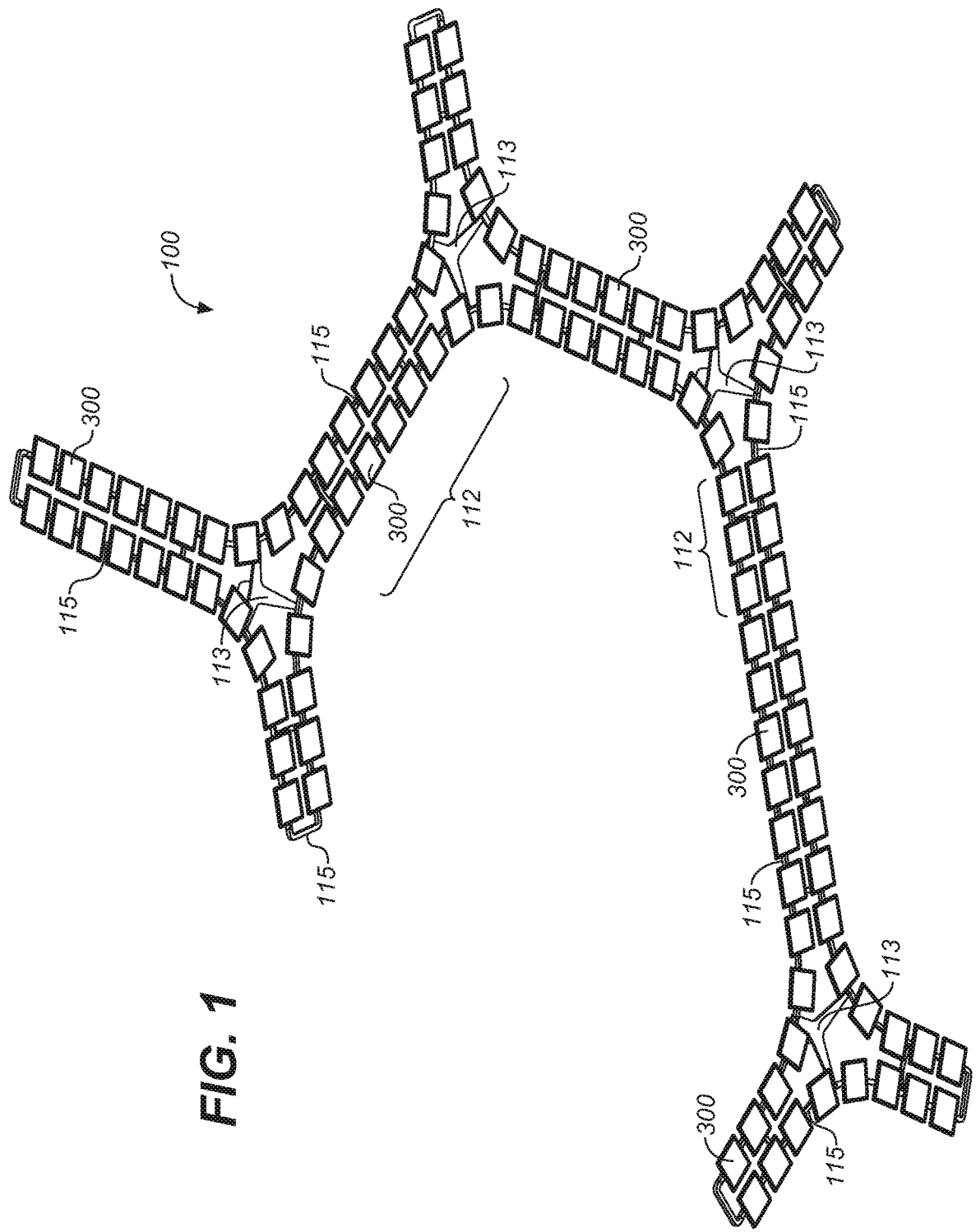
FIG. 1 is a bottom perspective view of a configurable, low profile lighting system comprising a large number of flat panel light sources, such as OLEDs, that would be held by a cassette in accordance with the invention.

Referring now to the drawings, FIG. 1 shows a configurable, two-dimensional lighting system 100 comprising a large number of flat panel light sources 300. The lighting system is formed of a plurality of low profile, radial hubs 113 that can be attached to or suspended from a ceiling surface and a plurality of connector rails 115 that connect to the suspended hubs. The hubs are interconnected in a manner that allows the lighting system to propagate out into a two dimensional plane along a ceiling surface. Additional hubs and connector rails can be used to expand the lighting system in multiple directions within the two dimensional plane.

The planar light sources 300 are connected to the hubs and connector rails of the lighting system to form a large array of light sources, with the hubs and connector rails providing wireways for electrical wiring, or other suitable conductors, for bringing power to the light sources. Preferably, flat panel light sources are OLED panels, but they could be other types of planar lighting elements or light sources in a planar configuration. Such configurable lighting system provides a wide range of design options for distributing light to different areas within a space.

Figure 2:
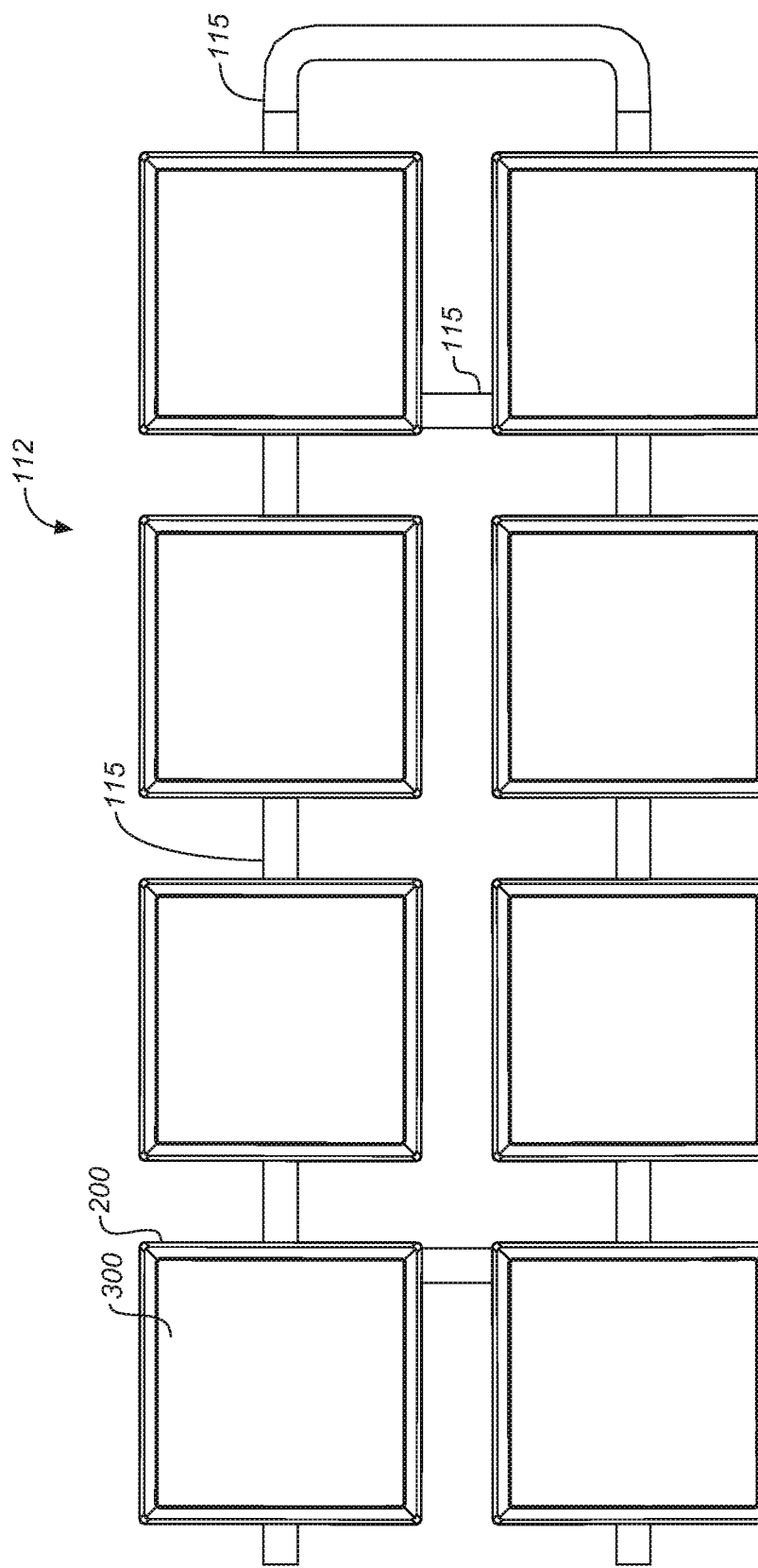
FIG. 2 is an enlarged bottom plan view of a straight section of the lighting system shown in FIG. 1.
Figure 3:
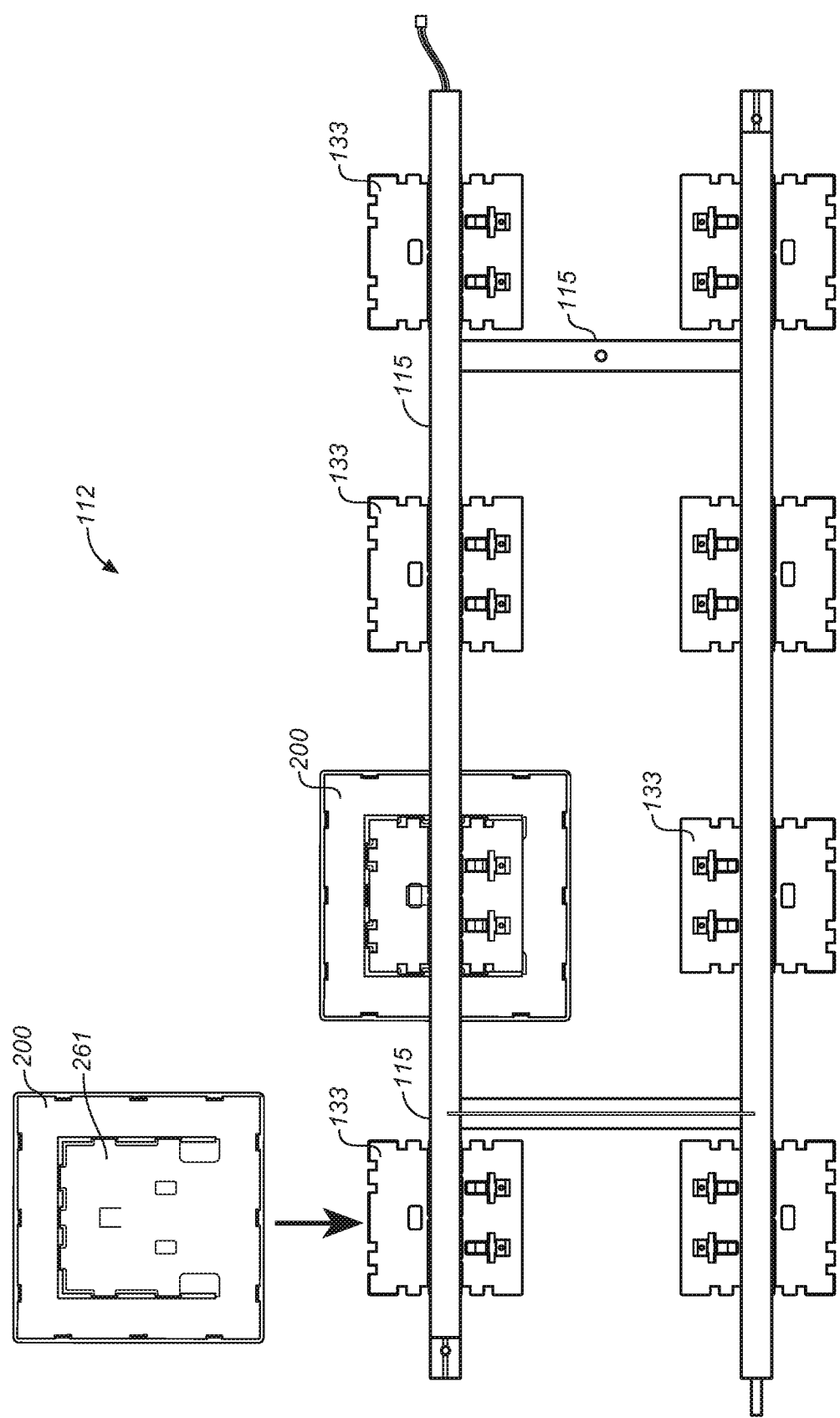
FIG. 3 is a top plan view thereof, showing how one or more cassettes in accordance with the invention can be releasably attached to the lighting system.

FIGS. 2 and 3 show a straight section 112 of the lighting system seen in FIG. 1. As shown in these figures, each flat panel light source 300 of the lighting system can be removably held in a cassette 200, which in turn can be releasably mounted to the system's connector rails 115 anywhere along the length of the rails. In lighting systems where the ability to remotely monitor and control individual lighting panels within the system is desired (for example, lighting fixtures tied into so-called power line communication or "PLC" systems), it is necessary to provide local addressable electronic drivers with each light source to be monitored or controlled. The cassettes 200 illustrated in FIG. 2 provide this capability. As described in detail below, the cassettes 200 hold both the planar light source and the local driver board, and to do so such that the light source is thermally isolated from the driver.

As best seen in FIG. 3, the cassettes 200 can be connected to the connector rails 115 of the lighting system by fastening them flat adaptor plates 133 fastened to the rails at space intervals. The cassettes can be attached to these adaptor plates by sliding the cassette onto the adaptor plate so that the adaptor plate is captured in a slide pocket 261 on the back of the cassette. This sliding mechanism is described in further detail below with respect to FIGS. 6 and 7.

The bottoms of the rails have suitable fastening means (not shown) for attaching the adaptor plate anywhere along the length of the rail and additionally have means for electrifying the OLED panel and driver through the adaptor plate. For example, the adaptor plate can have a longitudinal slot in its bottom side through which a fastener for the adaptor plate, such as a screw fastener, can be lockingly inserted, and through which an electrical or PLC connection path can be provided to the light source and driver board loaded in the cassette.

It can be seen that the connector rails 115 of the lighting system provide a continuous unbroken path between hubs 113. As mentioned above, the light sources can be operatively connected to any one of the rails of the hub, and anywhere along the path of any rail. Thus, the lighting system can be populated with light sources and drivers in any desired distribution. They can be evenly spaced, as illustrated in the drawings, or they can be unevenly spaced or clustered in groups of elements anywhere on the rails.

FIGS. 4-20B show the various details of an exemplary cassette in accordance with the invention. Referring first to FIGS. 4-8, it is seen that the cassette 200 holds a flat panel light source 300 and a driver board 400 that is loaded in the cassette. The driver board 400 can be any thin, generally planar electrical circuit board or electronic component that can be used to control or collect data from the flat panel light source. The cassette comprises a low profile framing structure for holding both the planar light source 300 and driver board 400. The low profile framing structure includes a low profile base plate 227 and a capture ring 239, which attaches to the bottom side of the base plate. Once the capture ring is attached (as described below), it holds the planar light source to the base plate over the driver board such that a gap 600 is maintained between the light source and driver board. As shown in FIG. 19A, this gap 600 ensures thermal isolation between the driver board and light source.

Figure 6:
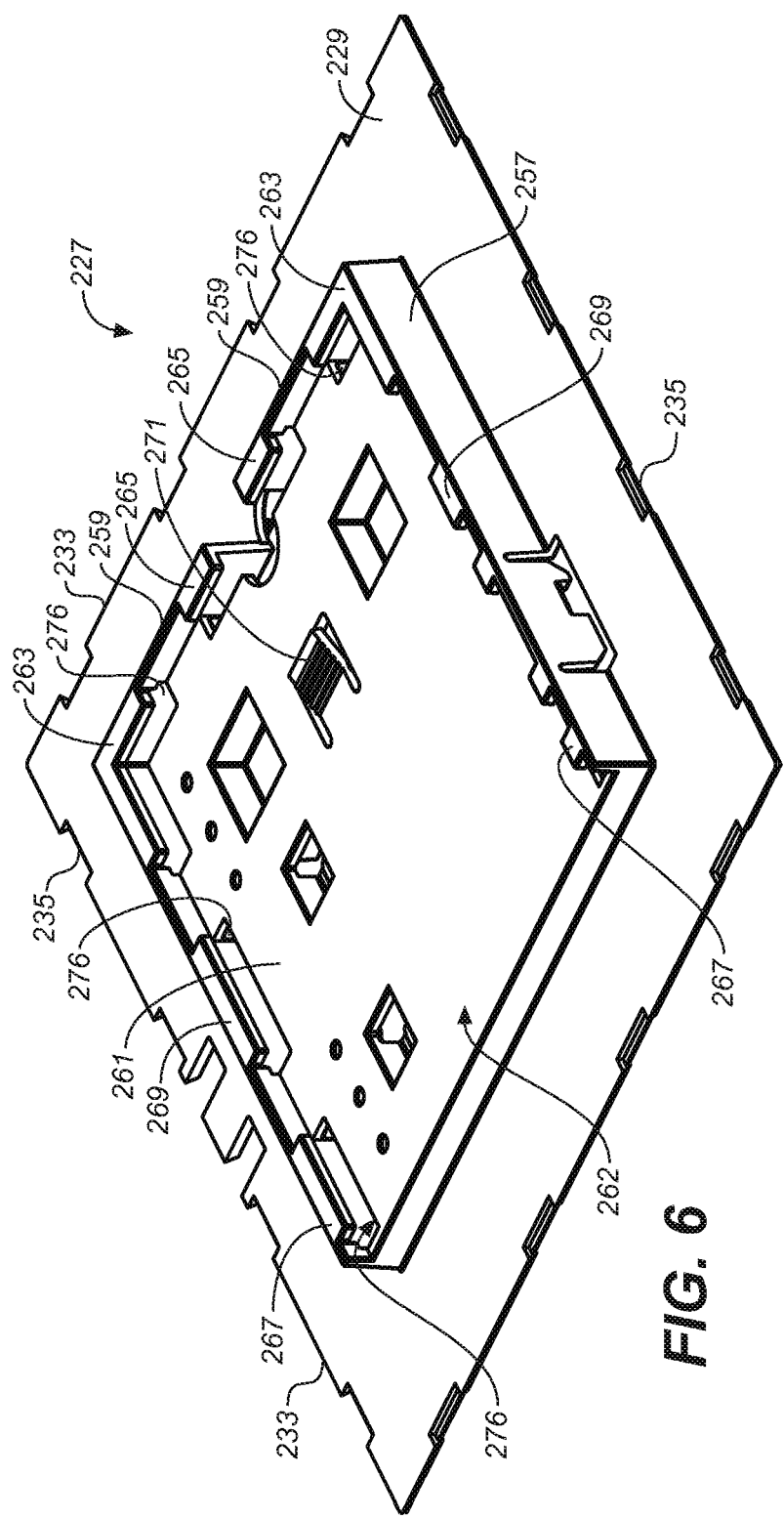
FIG. 6 is a top perspective view of the low profile base plate of the cassette.
Figure 7:
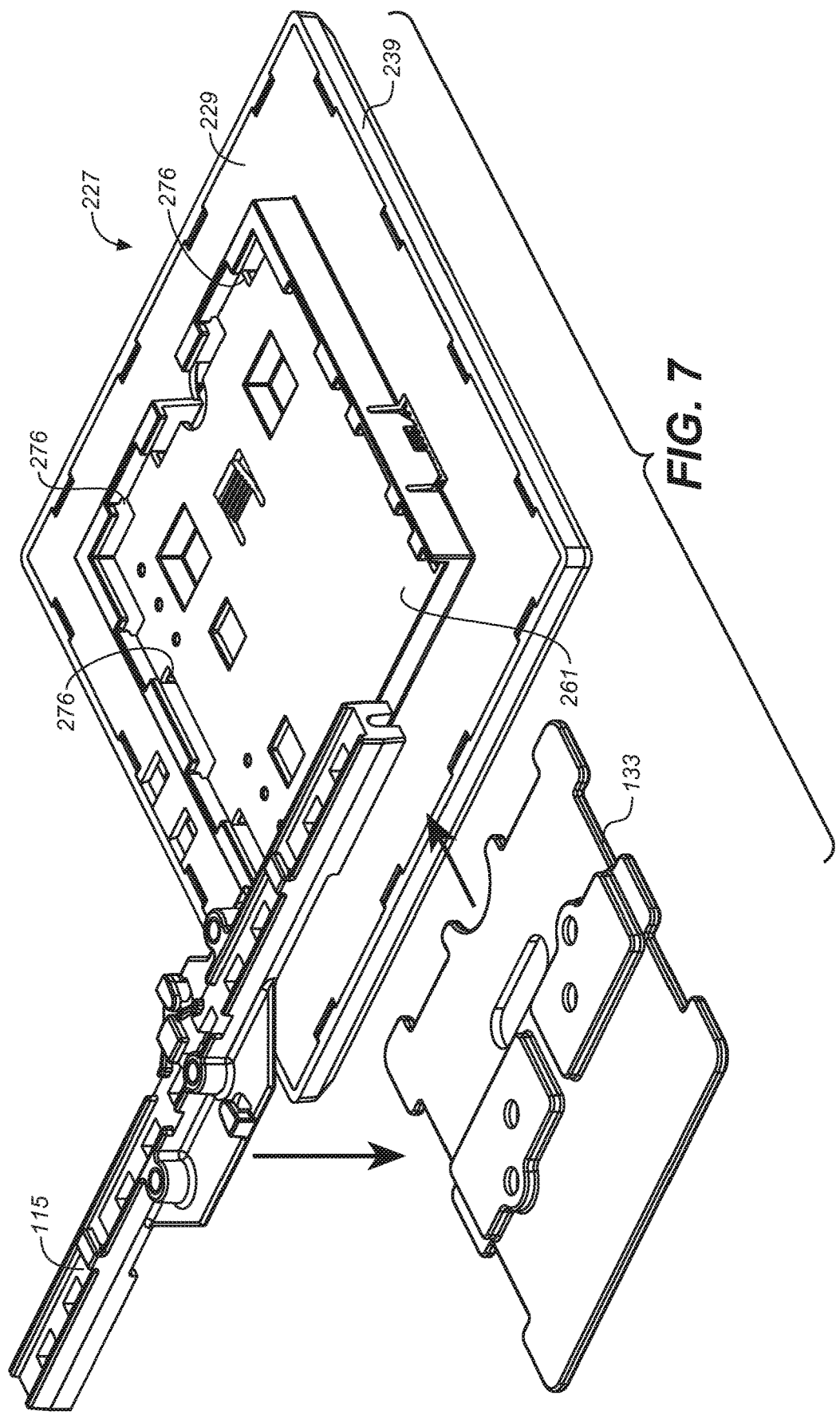
FIG. 7 is an exploded top perspective view thereof, showing how the mounting structure of a lighting system slides into the mounting structure retention means of the cassette.

Further details of this cassette and its low profile framing structure are now described in reference to FIG. 6. The cassette's base plate 227 has a top side 229, a bottom side 231 and perimeter edges 233. (The bottom side 231 may sometimes be referred to herein as the front side and the top side 229 as the back side.) The perimeter edges 233 can be provided with a series of recessed snap ledges 235 so that the capture ring 239 can be snap-fit onto the perimeter edges of the base plate 227.

Figure 9:
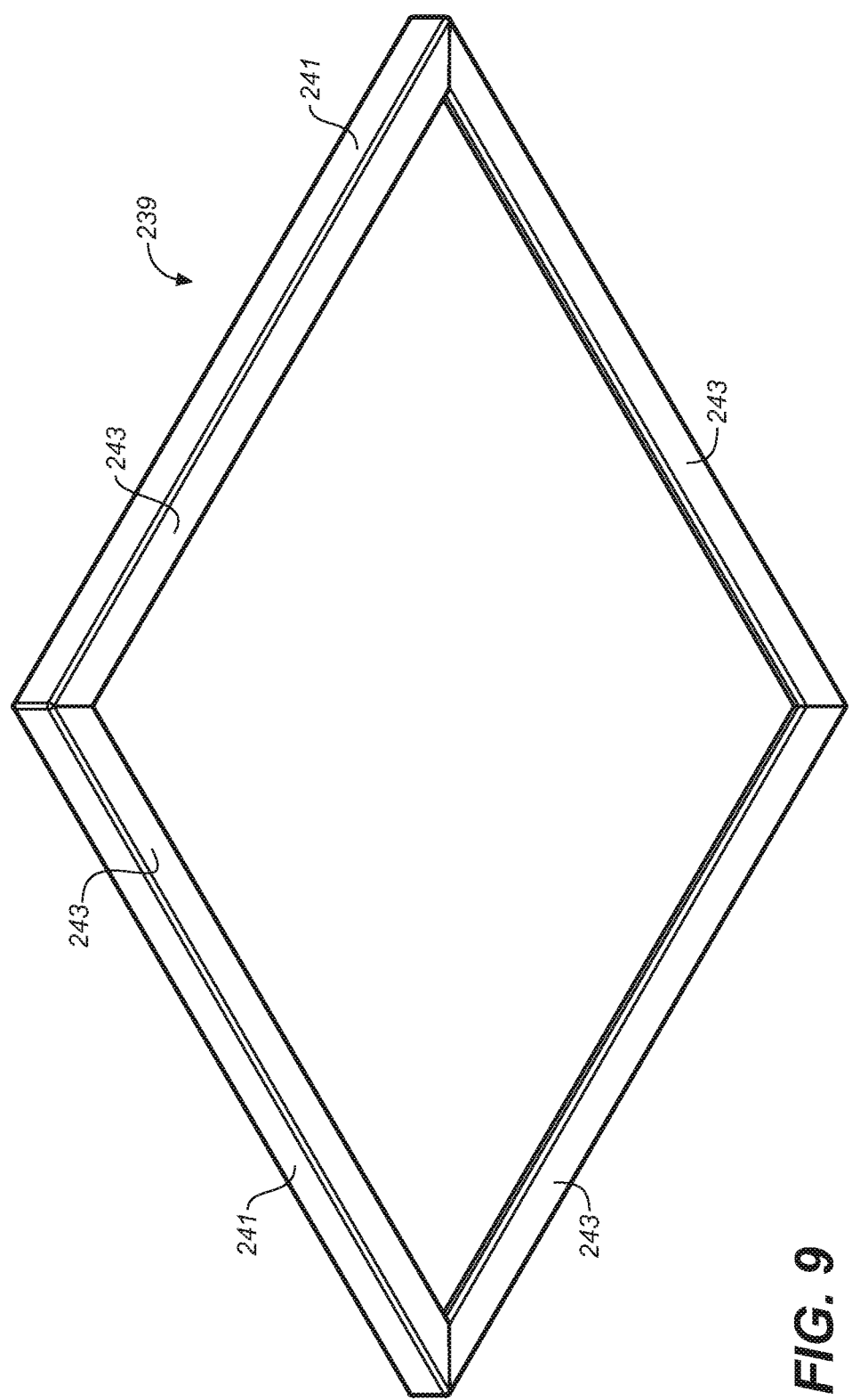
FIG. 9 is a bottom perspective view of the capture ring of the cassette.
Figure 10:
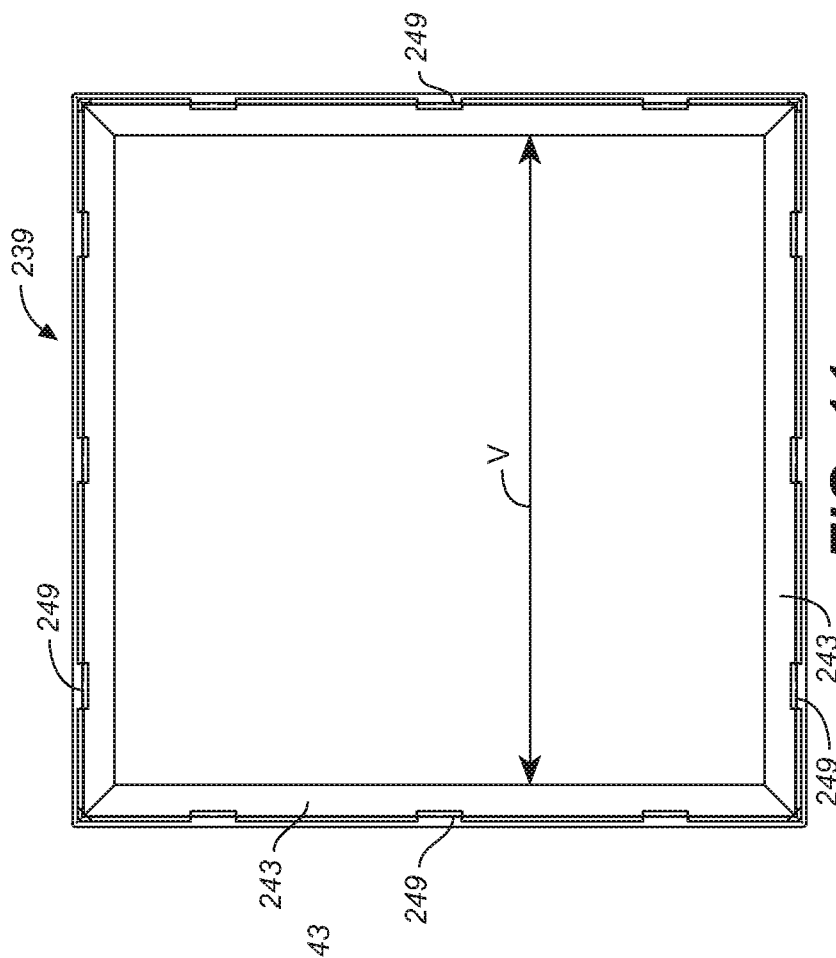
FIG. 10 is a bottom plan view thereof.
Figure 11:
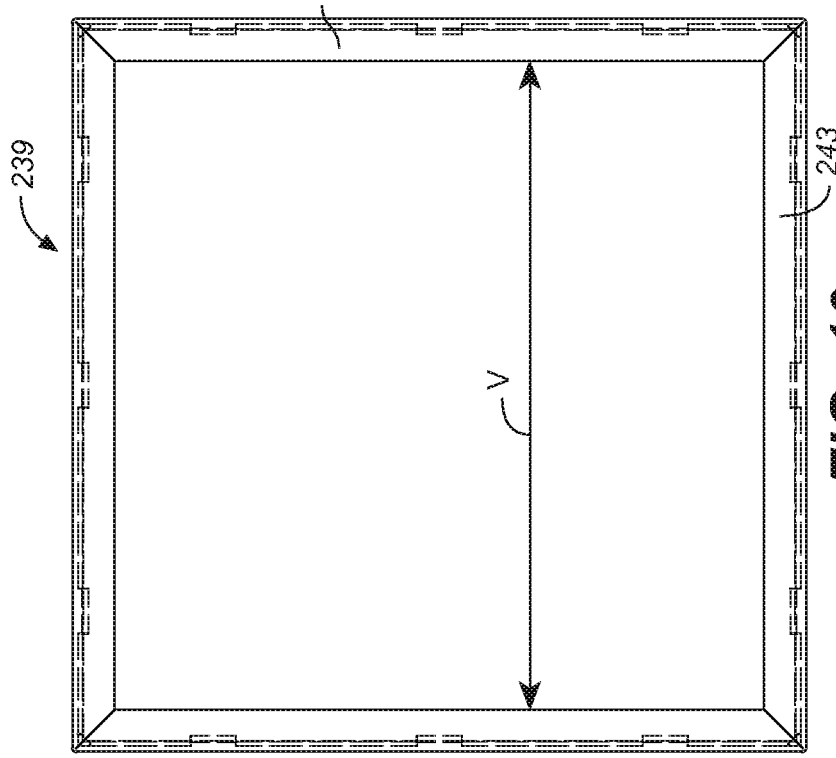
FIG. 11 is a top plan view thereof.
Figure 12:
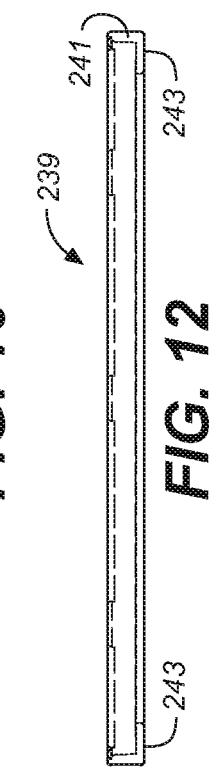
FIG. 12 is a side elevation view thereof.
Figure 13:
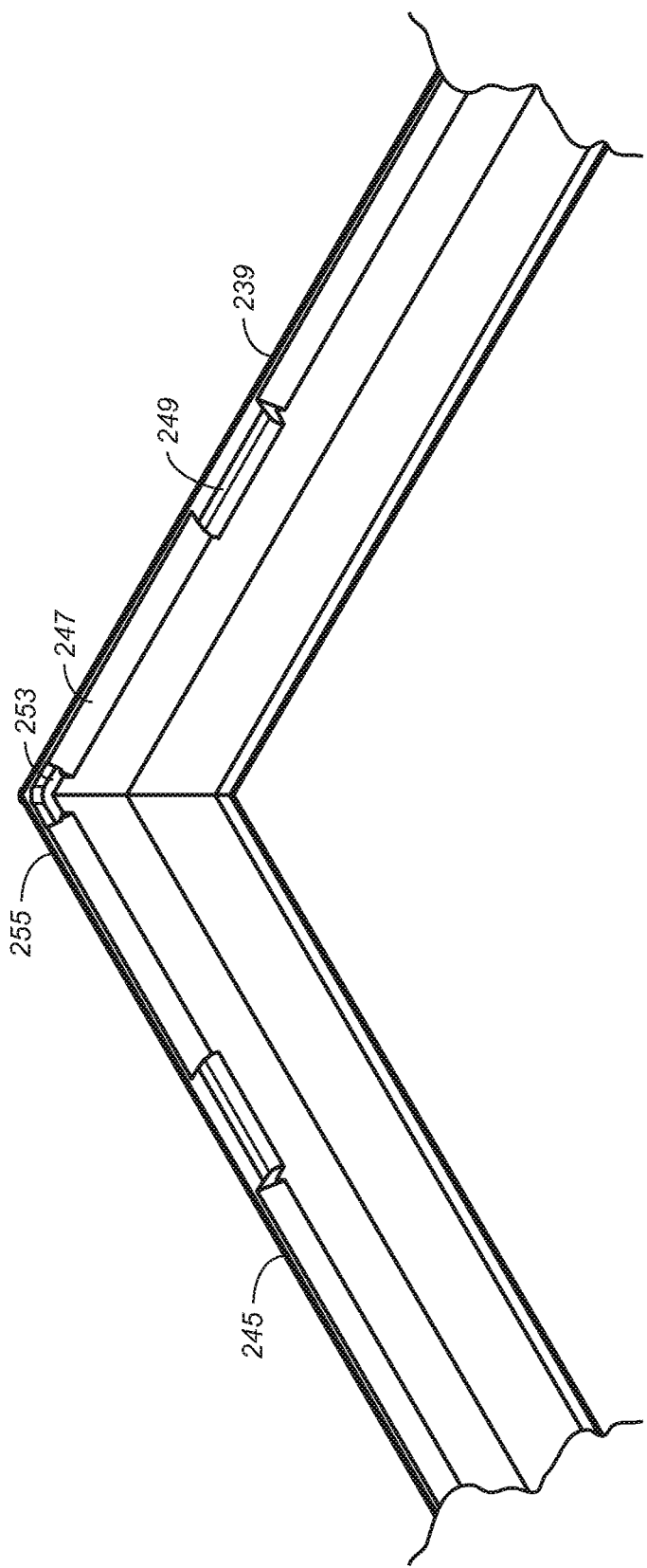
FIG. 13 is an enlarged fragmentary top perspective view thereof.

Features of the capture ring, as shown in FIG. 9, include vertical ring walls 241, an inwardly turned lip 243 at the bottom of the vertical ring walls, and a top snap-fit edge 245 at the top of the ring walls. As best shown in FIG. 13, top snap-fit edge 245 can have an inner chambered surface 247 and snap-fit projections 249 that snap onto and engage the recessed snap ledges 235 on the perimeter of the base plate when the capture ring is snapped onto the bottom side of the base plate.

Figure 4:
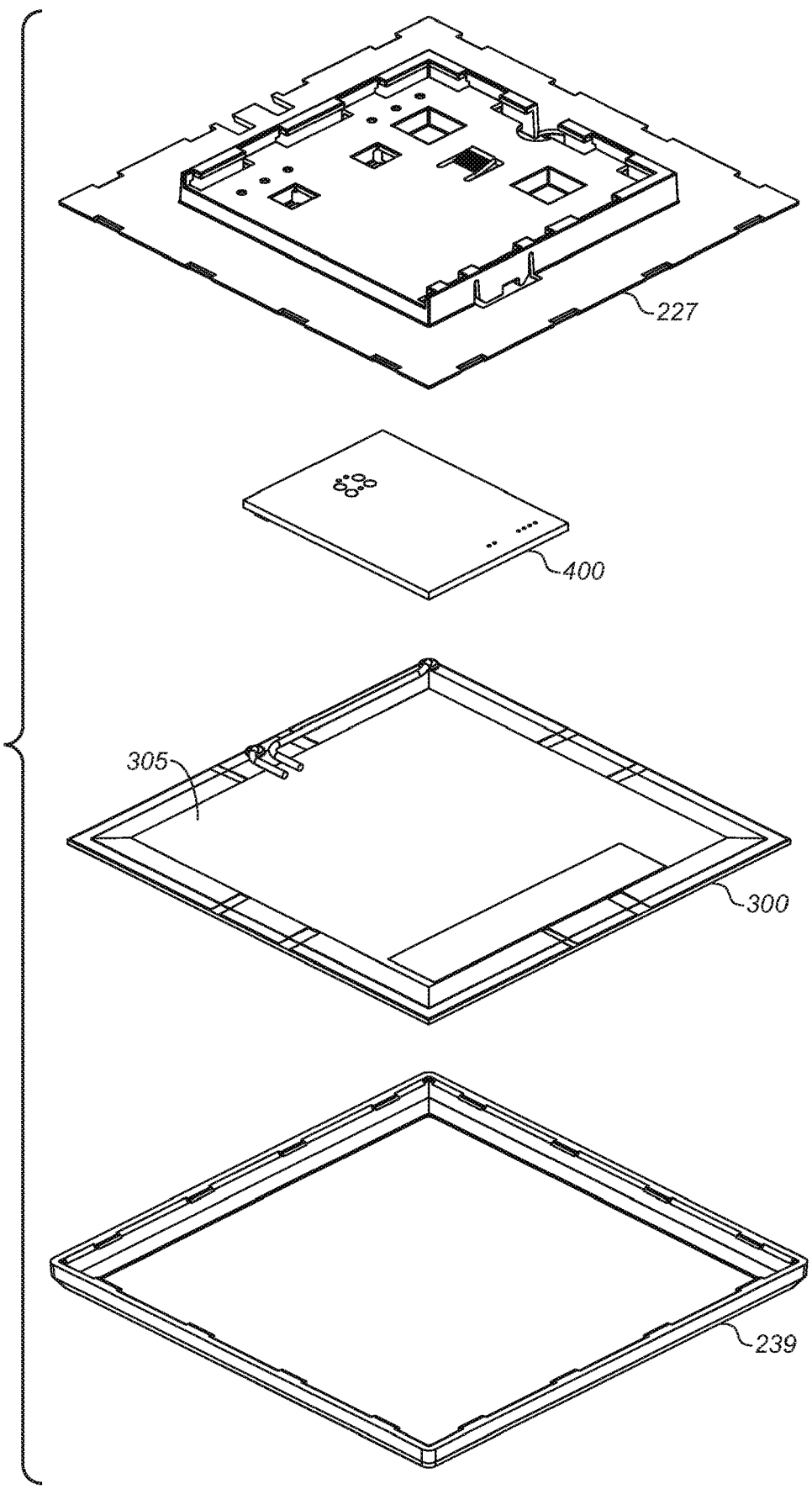
FIG. 4 is an exploded top perspective view of an exemplary cassette in accordance with the invention, along with a flat panel light source and driver board that can be loaded therein.
Figure 5:
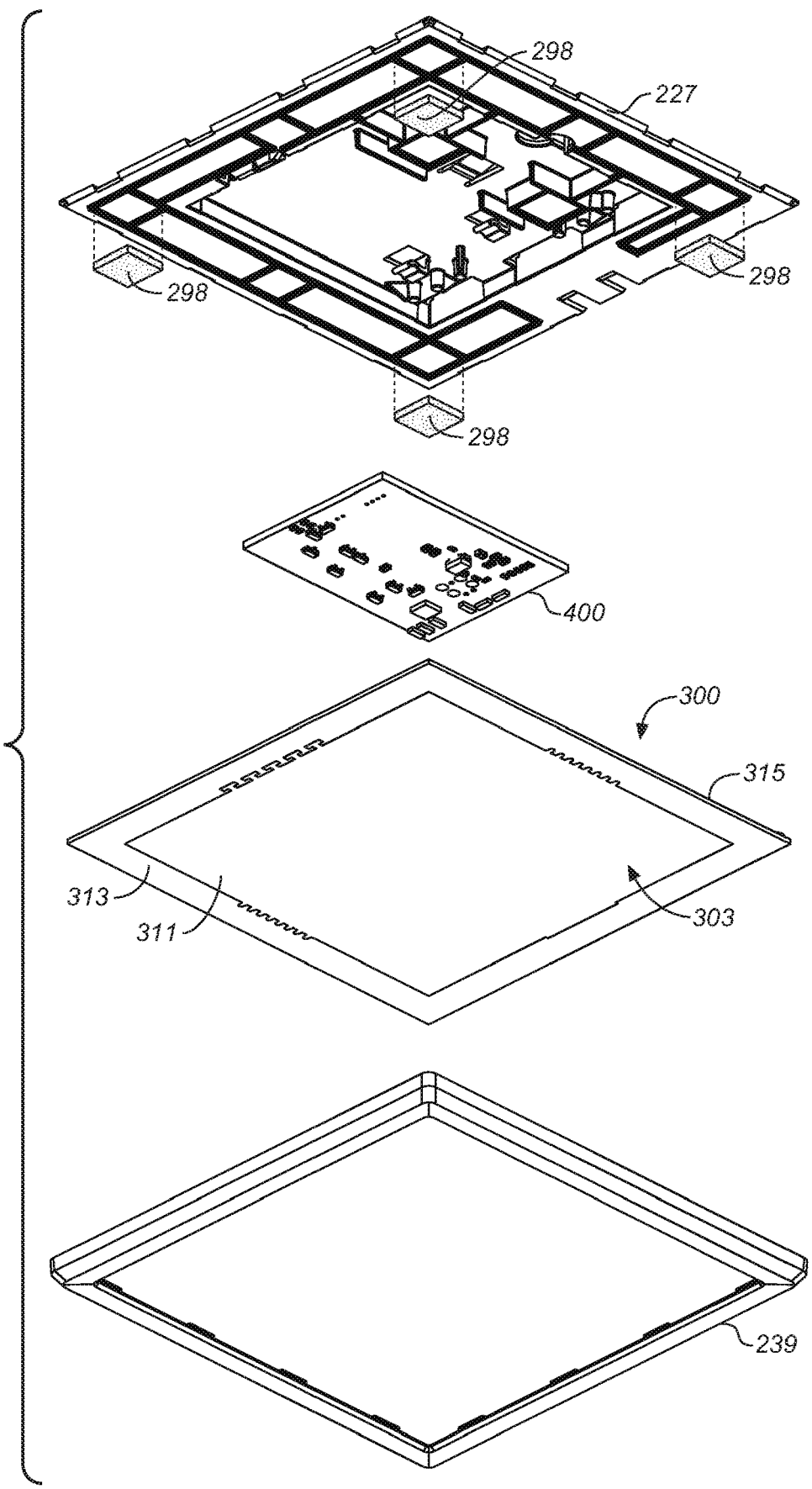
FIG. 5 is an exploded bottom perspective view thereof.

Referring to FIGS. 4 and 5, the planar light source 300 is seen to have a light emitting front side 303 and a back side 305. The light emitting front side of the planar light source has a luminous area 311 surrounded by a narrow non-luminous perimeter area 313. Light is only emitted from the luminous area when the light source is switched to an "on" state. The perimeter edges 315 of the planar light source will define the breath of the light source, and therefore generally determine the size of capture ring 239 and outer dimensions of the base plate. (The planar light source can, for example, be about four inches square.) Also, the footprint of base plate 227 of the cassette will preferably correspond to the footprint of the planar light source 300, such that the perimeter edges of these two components substantially align over most of their length when the planar light source 300 is placed against the bottom side 231 of the base plate 227.

Figure 14:
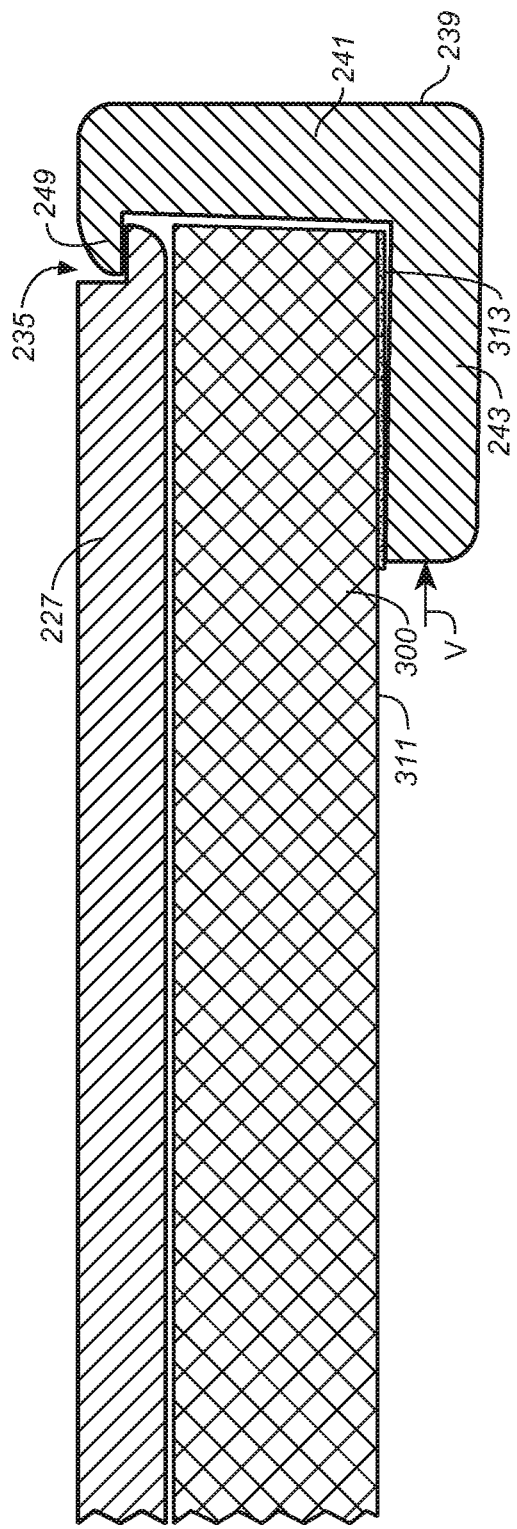
FIG. 14 is an enlarged fragmentary side elevation view of an assembled cassette in accordance with the invention with a planar light source loaded therein.

To affix the planar light source to the base plate, the capture ring 239 is simply snapped onto the base plate over the light source. The ring walls of the capture plate will closely surround the planar light source's perimeter edges 315, and the ring's inwardly turned lip 243 will extend over the perimeter light source's edges 315. As best shown in FIG. 14, lip 243 can be angled slightly upwardly toward the light source to ensure a positive contact with the light source at the end of the lip around the entirety of the perimeter of the light source. This will prevent shadowing in the viewable area of the light emitting surface of the light source, around the edges of the capture ring. Also, the turned-in lip 243 can be sized so as to create a viewable area, denoted by the letter "V" in FIGS. 10 and 11, which is slightly larger than the luminous area 311 of the OLED or other planar light source's light emitting surface. It is found that a slight oversizing of the viewable area V relative to the light source's luminous area (by approximately 0.05 inches) increases light output from the cassette thereby boosting efficiency of a luminaire.

The illustrated capture ring 239 is seen to have inset seating surfaces 253 at each corner 255 of the capture ring below its snap-fit edge 245. These corner seating surfaces provide a positive stop when the capture ring is engaged against the base plate. These stops provide for a snug fit between the base plate and the capture ring and prevent the capture ring from exerting excessive pressure on the planar light source.

When the capture ring is engaged against the base plate and the light source is captured therebetween, the light source rests against an outer ledge portion 280 on the bottom side of the base plate. Soft (e.g. foam) padding can be placed on the outer ledge portion, suitably at corners 281 or sides 282, or on one of the elevated stubs 293 of the base plate to provide a snug resilient contact between the base plate 227, the light source 300 and the capture ring 239. Examples of such padding are seen in FIG. 5, which shows contact padding in the form of resilient corner contact pads 298. Use of such padding allows the cassette to readily accommodate planar light sources of varying thickness.

The base plate and capture ring of the cassette are suitably fabricated of an insulator material such as PVC plastic.

It should be understood that low profile retention means other than a capture ring could be used to hold the planar light source 300 to base plate 227 in spaced relation to the driver board, so long as the retention means can releasably retain a planar light source against the bottom side of the base plate 227 without substantially obstructing the light source's luminous area 311. For example, separate retention channels might be provided on the bottom side of the base plate into which the planar light source can slide.

In the illustrated cassette, the mounting of the cassette to a low profile mounting structure—such as the mounting adapter 133 of the lighting system previously described—is accomplished by a low profile mounting structure retention means located on the top side 229 of the base plate 227. The base plate's top or back side is seen to include parallel side rails 257 and a back rail 259, which together form a slide pocket 261 having an open end 262. As shown in FIG. 3, the adapter plate 133 to which the cassette is attached can be secured in the cassette's slide pocket 261 by a sliding motion from the direction of the slide pocket's open end. When engage in the slide pocket, the adaptor plate is retained in a plane substantially parallel to the top side of the base plate by the turned-in, spaced apart capture walls at the top of the rails. These include back corner capture walls 263, back capture walls 265, and side capture walls 267, 269. Relief slots 276 can be provided in the base plate directly below the capture walls to prevent any wedging of the planar mounting structure between the capture walls and the top side of the base plate.

Spring tab 271 is provided on the top side 229 of the base plate 227 to lock into the adapter plate 133. When the adapter plate is slid into slide pocket 261 the spring tab is depressed and, once the adapter plate is fully engaged in the slide pocket, the spring tab will releasably snap into a spring tab opening in the adapter plate (not shown).

It should be understood that alternative mounting structure retention means other than a slide pocket 261 can suitably be used, such as fastening or bolting means, so long as the cassette 227 can be releasably attached to a low profile mounting structure of a lighting system, such as the adapter plate 133, and can do so while conforming to the lighting system's low profile aesthetics.

Figure 8:
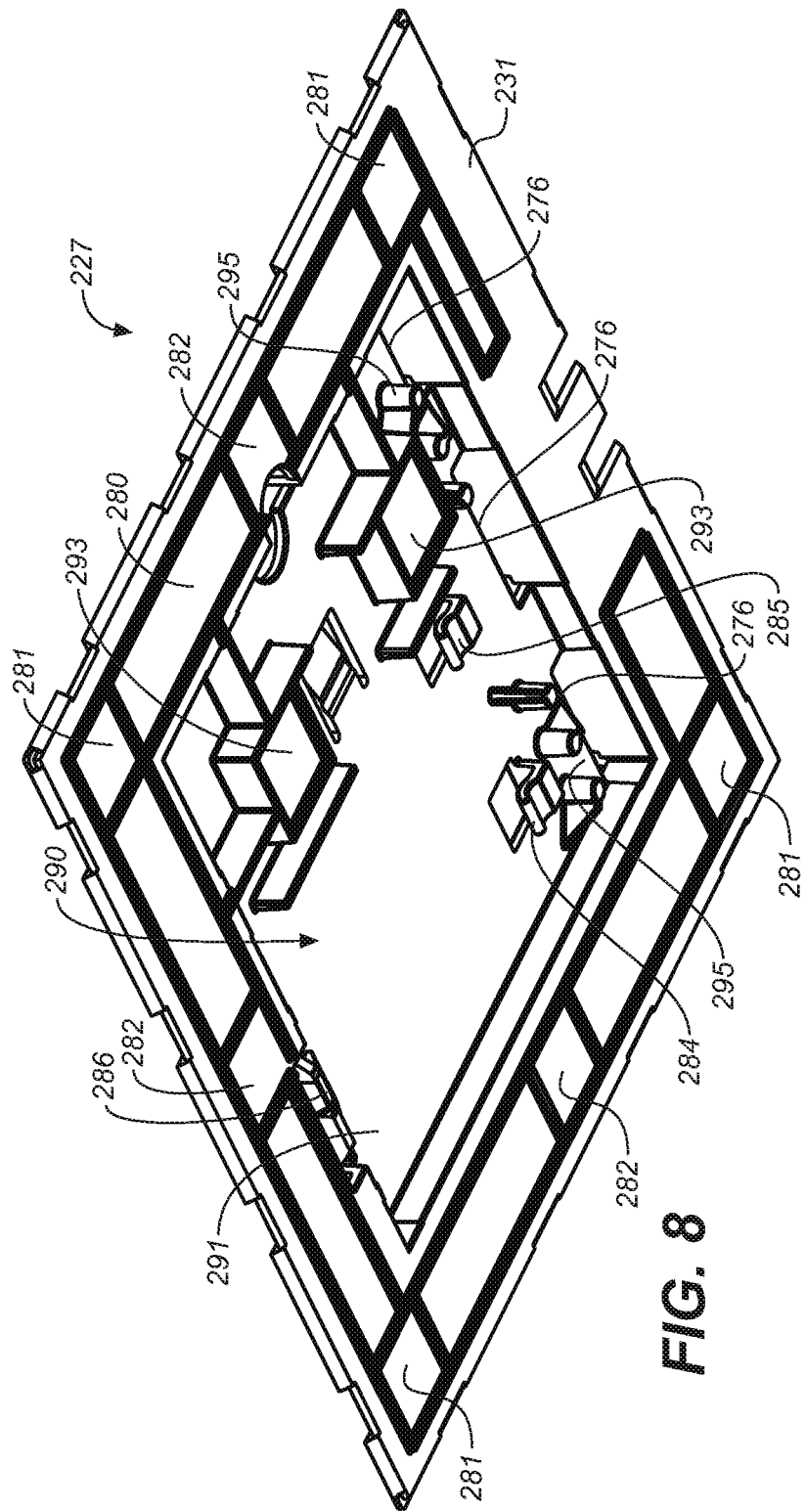
FIG. 8 is a bottom perspective view of the base plate of the cassette.

The cassette of the present invention can also hold a companion driver board 400 with the light source 300 and can do so while maintaining an air gap therebetween. As shown in FIG. 8, the bottom side of the base plate 227 includes a center recessed portion 290 having a substantially flat back wall 291, and includes a substantially flat, front-facing outer edge or ledge portion 280 surrounding the center recessed portion. As previously described, the outer ledge portion 280 of the base plate against which the planar light source is held defines a first plane (denoted P1 in FIGS. 19A and 20A) for the planar light source. The back wall 291 of the recessed portion 290 against which the driver board 400 is held provides a second plane (denoted P2 in FIGS. 19A and 20A) for the driver board, which is substantially parallel to and in space relation behind plane P1. Means for releasably retaining the driver board 400 against the back wall 291 are provided, for example, in the form of low profile clips 284 and 285 and a low profile springing tab 286. However, it is understood that other suitable, low profile retention means for the driver board could be used. The driver board can be loaded onto the base plate of the cassette by sliding one side of the driver board under clips 284 and 285 and snapping the opposite side of the driver board under springing tab 286. The driver board can be released from the base plate by pulling the springing tab 286 back and removing the driver board from under the clips 284 and 285.

Preferably, the back wall 291 is recessed a sufficient distance away from the outer ledge portion 280 such that, when both a driver board and a planar light source are retained in the cassette, no element of the driver board is in substantial contact with the planar light source. This will prevent heat produced by the driver board from damaging the light source. Additionally, elevated stubs 293, extending from the back wall 291 to substantially the same height as the outer ledge portion, provide additional support onto which the planar light source can rest.

It should be understood that other suitable, low profile configurations of the base plate 227 can be used, as long as the planar light source and driver board can be maintained in separate, substantially parallel planes such that there is little or no contact between driver board and the light source held in the cassette.

Figure 15:
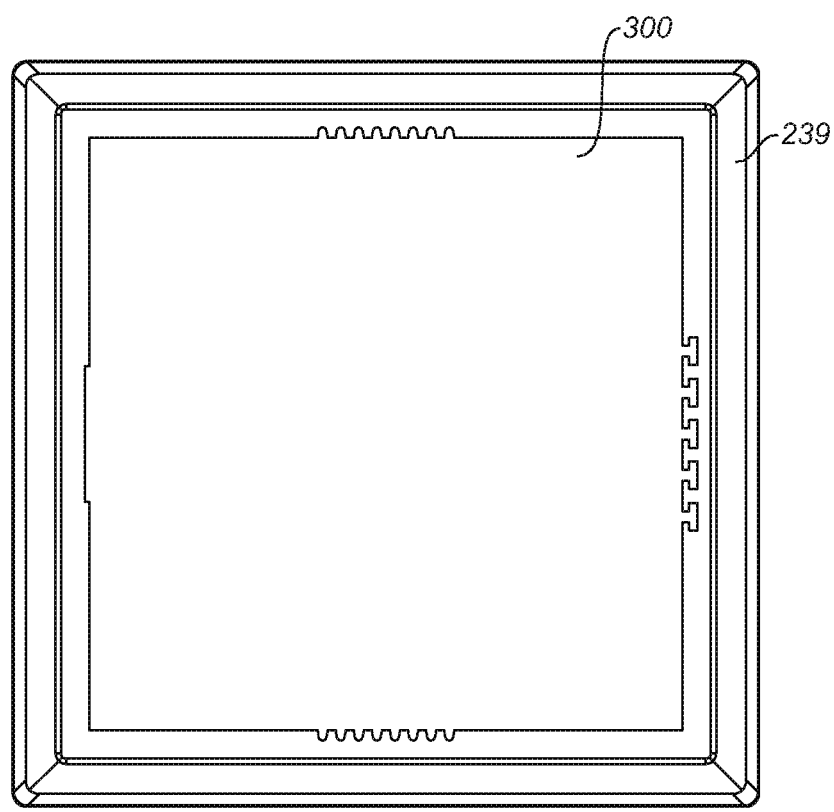
FIG. 15 is a bottom plan view thereof.
Figure 16:
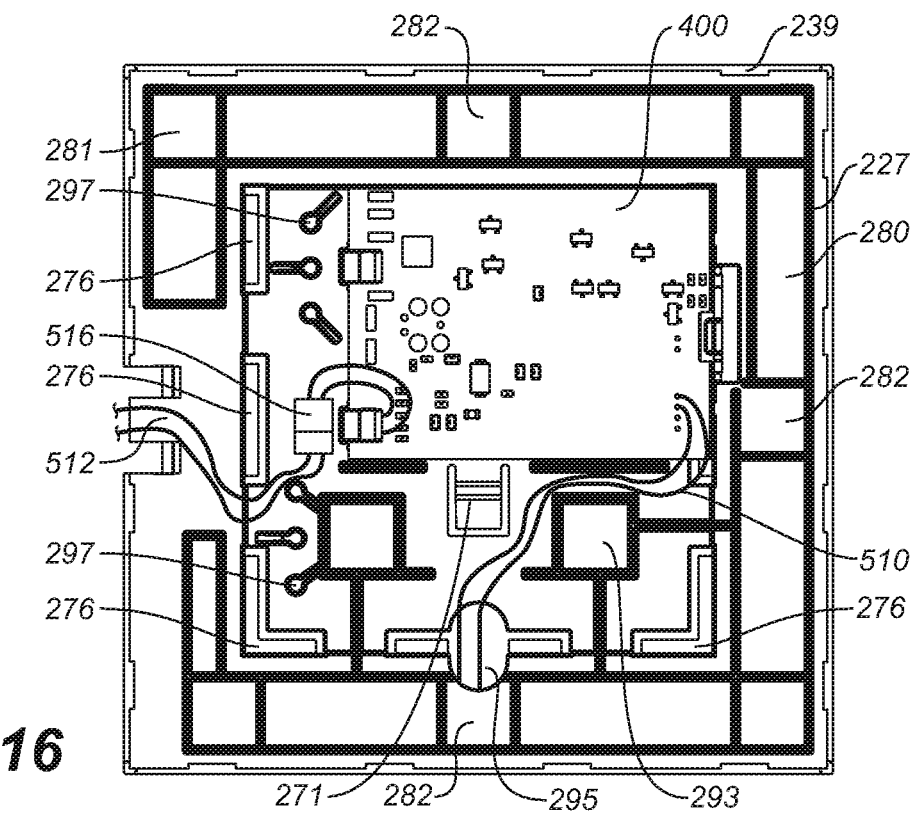
FIG. 16 is a bottom plan view of an assembled cassette in accordance with the invention with a flat panel driver loaded therein and no planar light source.

FIG. 15 is a bottom plan view of an assembled cassette in accordance with the invention with an OLED panel and driver board loaded therein. FIG. 16 is the same view with the OLED panel removed. Here the cassette 200 can be seen with accommodations for electrical wiring between the lighting system 100, the driver board 400 and the light source 300. Wire slot 295 in the base plate of the cassette allows for wiring 510 from the lighting system to enter the cassette where it can be connected directly to the driver board 400. In turn, wiring 512 from the driver board can connect directly to the light source 300 (not shown) or can connect to a wire connector 516 which can in turn more easily be connected to the wiring of the light source. Wireways 297 can be fabricated into the recessed portion of the base plate to guide the wiring 510 and 512 or to securely hold the wire connector 516. It should be understood that many other configurations of wiring slots and wireways are possible, as long as electrical or PLC connection pathways are provided from the lighting system 100 to the light source and driver board loaded in the cassette Replacing either the light source or the driver board can be done while the base plate of the cassette remains attached to the mounting structure of the lighting system.

The light source can be readily replaced simply by removing the capture ring 239, dropping the light source from the bottom side of the cassette's base plate 229, placing a new light source against the base plate, and snapping the capture ring back onto the base plate.

The driver board can also be readily replaced by first removing the capture ring and light source from the bottom side of the cassette's base plate, replacing the driver board, and then reattaching the light source and capture ring onto the base plate.

Loadable cassettes such as those described herein can be used in a wide variety luminaire or lighting system configurations other than the above-described configurable, two-dimensional lighting system. The cassette is suitable for use where low profile light sources, such as flat OLED panels, are desired and are also suitable where each light source is to be mounted with its own companion driver board.

While various aspects of the loadable cassette of the invention have been described herein in detail, it is not intended that the invention, or any aspect of the invention, be limited to such detail, except as may be necessitated by the following claims.

What we claim is:

1. A cassette for holding a planar light source and a companion driver board, the cassette comprising:
    a low-profile framing structure comprising:
    a center recessed portion with a flat back wall, and
    a flat, front-facing outer ledge portion surrounding the center recessed portion, the outer ledge portion being in a plane elevated away from and substantially parallel to the back wall of the center recessed portion,
    one or more stubs disposed on the back wall of the center recessed portion and extending to the plane of the outer ledge portion, and
    retainer means associated with the framing structure configured to releasably retain a companion driver board to the back wall of the center recessed portion and to releasably retain a planar light source against the outer ledge portion and the one or more stubs,
    wherein the back wall of the center recessed portion and the plane of the outer ledge portion are spaced apart a sufficient distance such that when the planar light source and companion driver board are retained within the framing structure no portion of the driver board is in contact with the planar light source.

2. The cassette of claim 1 wherein the low-profile framing structure further comprises:
    a connector structure retention means configured to receive and releasably hold a low-profile cassette connector structure of a luminaire or lighting system.

3. The cassette of claim 2 wherein the connector structure retention means further comprises:
    a low-profile slide pocket configured to slidably receive a substantially flat low profile cassette connector structure of a luminaire or lighting system in a slide motion that is substantially parallel to the low-profile framing structure of the cassette.

4. The cassette of claim 3 wherein the connector structure retention means further comprises:
    a spring means configured to releasably engage the low-profile cassette connector structure of a luminaire or lighting system when the connector structure is fully engaged in said slide pocket, said spring means acting to releasably lock the connector structure in said slide pocket.

5. The cassette of claim 1 wherein the planar light source has a light emitting surface, and wherein the low-profile framing structure defines a viewable area through which the light emitting surface of the planar light source can be viewed.

6. The cassette of claim 1 wherein the low-profile framing structure has electrical connection throughways through which electrical connections can be made between the planar light source, the companion driver and a luminaire or lighting system.

7. The cassette of claim 1 further comprising resilient padding configured for placement between a planar light source and the low-profile framing structure when the light source is retained in the low-profile framing structure.

8. A cassette for holding a planar light source and companion driver board, the cassette comprising:
    a low-profile base plate comprising:
    a center recessed portion with a flat back wall, the flat back wall being in a first plane,
    a flat, front-facing outer ledge portion surrounding the center recessed portion, the outer ledge portion being in a second plane elevated away from and substantially parallel to the first plane, and
    one or more stubs disposed on the back wall of the center recessed portion and extending to the second plane of the outer ledge portion,
    the low-profile base plate configured to releasably retain a companion driver board in the first plane and to support a planar light source in the second plane, and
    a low-profile capture ring configured to attach to the base plate, wherein, when attached to the base plate, the capture ring retains the planar light source in the second plane;
    wherein such first and second planes are spaced apart a sufficient distance such that, when the planar light source and companion driver board are retained within the base plate and capture ring, no portion of the driver board is in substantial contact with the planar light source.

9. The cassette of claim 8 wherein the planar light source held by the cassette has a light emitting surface, and wherein the low-profile capture ring defines a viewable area through which the light emitting surface of the planar light source can be viewed.

10. The cassette of claim 9 wherein the light emitting surface of the planar light source held by the cassette has a luminous area, and wherein the viewable area of the low-profile capture ring is slightly larger than the luminous area of the planar light source held thereby.

11. The cassette of claim 9 wherein the low-profile base plate has electrical connection throughways through which electrical connections can be made between the planar light source, the companion driver and a luminaire or lighting system.

12. The cassette of claim 9 wherein the low-profile base plate further comprises:
a connector structure retention means configured to receive and releasably hold a low-profile cassette connector structure of a luminaire or lighting system.

13. The cassette of claim 12 wherein the connector structure retention means further comprises:
a low-profile slide-in retention means in the form of a slide pocket configured to slidably receive a substantially flat low profile cassette connector structure of a luminaire or lighting system in a slide motion that is substantially parallel to the low profile framing structure of the cassette.

14. A cassette for holding a planar light source and companion driver board such that the planar light source and driver board are thermally isolated from one another and such that they can be operatively connected to a luminaire or lighting system, the cassette comprising:
a low-profile base plate comprising:
a center recessed portion having a substantially flat back wall, and
a substantially flat, front-facing outer ledge portion surrounding the center recessed portion, the outer ledge portion being in a plane elevated away from and substantially parallel to the back wall of the recessed portion,
one or more stubs disposed on the back wall of the recessed portion and extending to the plane of the outer ledge portion, and
retainer means associated with the center recessed portion configured to releasably retain a driver board along the back wall of the center recessed portion, and
a capture ring configured to be releasably attached to the base plate and configured to retain a planar light source against the outer ledge portion and the one or more stubs,
wherein the back wall of the center recessed portion is recessed a sufficient distance away from the plane of the outer ledge portion and the one or more stubs such that when a driver board and planar light source are retained in the cassette no element of the driver board is in contact with the planar light source.

15. The loadable cassette of claim 14 wherein the capture ring has vertical ring walls and an inwardly turned lip at the bottom of the ring walls for contacting the perimeter edges of the planar light source.

16. The loadable cassette of claim 15 wherein the inwardly turned lip at the bottom of the capture ring's vertical ring walls is angled slightly upward toward the planar light source held by the cassette to achieve positive contact between the end of the lip and the planar light source.

17. The loadable cassette of claim 16 wherein the capture ring has defined corners and wherein seating surfaces are located in the corners of the capture ring to provide a positive stop when the capture ring is attached to the base plate, and wherein the positive stop provides for a snug fit between the base plate and the capture ring and prevents the capture ring from damaging the planar light source held by the cassette.

18. The cassette of claim 17 wherein the planar light source held by the cassette has a light emitting surface, and wherein the capture ring defines a viewable area through which the light emitting surface of the planar light source can be viewed.

19. The cassette of claim 18 wherein the light emitting surface of the planar light source held by the cassette has a luminous area, and wherein the viewable area of the capture ring is slightly larger than the luminous area of the planar light source held thereby.

20. The cassette of claim 14 wherein the low-profile base plate further comprises:
a connector structure retention means configured to receive and releasably hold a cassette connector structure of a luminaire or lighting system.

21. The cassette of claim 20 wherein the connector structure retention means further comprises:
a low-profile slide-in retention means in the form of a slide pocket configured to slidably receive a substantially flat low profile cassette connector structure of a luminaire or lighting system in a slide motion that is substantially parallel to the low profile base plate.

22. The cassette of claim 14 further comprising resilient padding configured for placement between a planar light source and the outer ledge portion of the base plate when the light source is retained by the capture ring against the outer ledge portion and the one or more elevated stubs.

* * * * *